(12) United States Patent
Bunin et al.

(10) Patent No.: US 11,495,968 B2
(45) Date of Patent: Nov. 8, 2022

(54) CONTINUOUSLY ADJUSTABLE SATURABLE REACTOR

(71) Applicant: Siemens Energy Global GmbH & Co. KG, Munich (DE)

(72) Inventors: Anatoliy Bunin, Stein (DE); Matthias Kuestermann, Nuremberg (DE); Martin Schwendner, Roth (DE); Thomas Manthe, Ueckermuende (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 42 days.

(21) Appl. No.: 17/046,420

(22) PCT Filed: Apr. 9, 2018

(86) PCT No.: PCT/EP2018/059028
§ 371 (c)(1),
(2) Date: Oct. 9, 2020

(87) PCT Pub. No.: WO2019/197014
PCT Pub. Date: Oct. 17, 2019

(65) Prior Publication Data
US 2021/0119451 A1   Apr. 22, 2021

(51) Int. Cl.
*H02J 3/18*   (2006.01)
*H01F 27/24*   (2006.01)
(Continued)

(52) U.S. Cl.
CPC ............... *H02J 3/18* (2013.01); *H01F 27/24* (2013.01); *H01F 27/28* (2013.01); *H01F 29/146* (2013.01)

(58) Field of Classification Search
CPC .......... H02J 3/18; H02J 3/1864; H02J 3/1842; H02J 3/1807; H01F 27/24; H01F 27/28;
(Continued)

(56) References Cited

U.S. PATENT DOCUMENTS 3,611,224 A   10/1971   Becker
6,420,856 B1   7/2002   Sen et al.
(Continued)

FOREIGN PATENT DOCUMENTS

DE   202013004706 U1   8/2013
DE   102012110969 A1   3/2014
(Continued)

*Primary Examiner* — Lincoln D Donovan
*Assistant Examiner* — Alex W Lam
(74) *Attorney, Agent, or Firm* — Laurence A. Greenberg; Werner H. Stemer; Ralph E. Locher

(57) ABSTRACT

A device for reactive power compensation in a high-voltage network contains a phase conductor. A high-voltage connection is provided for each phase of the high-voltage network. Each high-voltage connection is connected to a first high-voltage winding which surrounds a first core portion and to a second high-voltage winding which surrounds the second core portion. The core portions are part of a closed magnetic circuit. The low-voltage ends of each high-voltage winding can be connected to at least one saturation switching branch configured to saturate the core portions and has actuatable power semiconductor switches controlled by a control unit. To manufacture the device inexpensively, each saturation switching branch has a two-pole submodule having a bridge circuit and a DC voltage source so that, depending on the actuation of the power semiconductor switches, the DC voltage source can either be connected in series to the high-voltage winding or can be bridged.

10 Claims, 6 Drawing Sheets

(51) Int. Cl.
*H01F 27/28* (2006.01)
*H01F 29/14* (2006.01)

(58) Field of Classification Search
CPC ........ H01F 29/146; H01F 29/14; H01F 27/42; H01F 2029/143; Y02E 40/30
See application file for complete search history.

(56) References Cited

U.S. PATENT DOCUMENTS

| | | |
|---|---|---|
| 10,056,886 B2 | 8/2018 | Bunin et al. |
| 2002/0050829 A1 | 5/2002 | Xu |
| 2021/0234474 A1* | 7/2021 | Otake .................. H02M 7/493 |

FOREIGN PATENT DOCUMENTS

| | | |
|---|---|---|
| EP | 3168708 A1 | 5/2017 |
| WO | 2004054065 A1 | 6/2004 |

* cited by examiner

CONTINUOUSLY ADJUSTABLE SATURABLE REACTOR

BACKGROUND OF THE INVENTION

Field of the Invention

The invention relates to a device according to the preamble of the independent patent claim.

Such a device is already known from EP 3 168 708 A1. That document discloses a so-called "Full Variable Shunt Reactor" (FVSR), which represents a further development of a "Magnetically Controlled Shunt Reactor" (MCSR). The existing known device has two parallel-connected high-voltage windings, each of which encloses a core arm of a closed iron core and is connected at its high-voltage end to a phase conductor of a high-voltage network. The low-voltage sides of the high-voltage windings can be connected by way of a transistor switch either to an appropriately polarized thyristor power converter or directly to an earth connection. The thyristor power converter is designed to generate a DC current in the high-voltage winding connected to it. The DC current is adjusted such that the core arm surrounded by the winding is driven into a desired saturation state. In this saturation state, for example, the core material has a very small magnetic permeability, which increases the magnetic resistance of the winding and lowers its inductance. The saturation of the said core sections is polarization-dependent, so that an alternating current flowing through the windings flows essentially through only one of the two high-voltage windings, depending on its polarization. For example, a positive alternating current flows through the first high-voltage winding, while a negative alternating current flows to ground via the second high-voltage winding. If the current is driven only via a high-voltage winding, the other winding, which does not currently have the alternating current passing through it, can be energized with a DC current to saturate the core arm that it surrounds to the desired extent.

Magnetically controlled reactor coils are also known from DE 20 2013 004 706 U1 and DE 10 2012 110 969.

The disadvantage of the device mentioned above is that it is complex in terms of its design, and therefore expensive. For example, RC elements are necessary to prevent overvoltages on the low-voltage side of the high-voltage winding. Furthermore, in addition to the thyristor power converters, transistor switches are required.

SUMMARY OF THE INVENTION

The object of the invention is therefore to provide a device of the type mentioned above, which is simple in its design and therefore inexpensive.

The invention achieves this object by the fact that each saturation switching branch has at least one two-pole submodule with a bridge circuit, which has power semiconductor switches and a DC voltage source, so that depending on the actuation of the power semiconductor switches, the DC voltage source can either be connected in series to at least one high-voltage winding or bypassed.

According to the invention, the saturation switching branch, which can be connected either to one or both of the high-voltage windings, comprises a bridge circuit. The bridge circuit allows a flexible connection of a DC voltage source, which ensures the desired saturation of the core section. For this purpose, the bridge circuit is configured such that the DC voltage source can be connected in series with the respective high-voltage winding, thus ensuring that the DC voltage source has the desired polarity. For example, during a negative half-wave of the alternating voltage the DC voltage source is connected in series with the first high-voltage winding, in such a way that the former drives a DC current through the first high-voltage winding, which flows from the DC voltage source to the high-voltage winding. In a second switching position of the bridge circuit, on the other hand, the DC voltage source is bypassed so that alternating current can flow from the first high-voltage winding to a potential point which is earthed, for example.

On this point, it should additionally be noted that at any given time it is practical to connect only one saturation switching branch to a high-voltage winding. All high-voltage windings are connected to each other on their low-voltage side only in a bypassed position of the one or other of the switching branches.

Within the scope of the invention, either the same DC voltage source or a different DC voltage source can be connected to the second high-voltage winding. The DC voltage sources are conveniently designed identically, but can also differ from each other within the scope of the invention. Within the scope of the invention, the DC voltage source is connected to the second high-voltage winding with a reverse polarity so that in the case of a series circuit the saturation DC current flows from the second high-voltage winding to earth. This then ensures a correspondingly polarized saturation of the second core section.

The bridge circuit within the scope of the invention is a circuit consisting of the power semiconductor switches and the DC voltage source, which enables either the voltage dropped across the DC voltage source or a zero voltage, in which case the DC voltage source is bypassed, to be generated at the two terminals of the bridge circuit, or in other words, the submodule. For example, the bridge circuit is designed as a half-bridge circuit, or in other words, a half-bridge. In this advantageous development of the invention, a separate saturation switching branch is required for the first high-voltage winding and the second high-voltage winding, wherein the DC voltage source assigned to the first high-voltage winding has the opposite polarity to the DC voltage source connected to the second high-voltage winding. If each switching branch comprises a plurality of submodules and thus a plurality of DC voltage sources, these have the same polarity with respect to the respectively assigned high-voltage winding. A half-bridge circuit has a single series circuit branch consisting of two power semiconductor switches, which is connected in parallel with the DC voltage source. One terminal of the submodule is connected to the potential point between the power semiconductor switches of the series circuit branch, and the other terminal is connected to a pole of the DC voltage source.

However, the bridge circuit is preferably designed as a so-called full bridge circuit or H-circuit, so that the actuation of the power semiconductor switches not only allows the source voltage dropped across the DC source, but also the inverse source voltage, to be applied to the terminals. Both the half-bridge circuit and the full-bridge circuit enable their DC voltage source to be bypassed.

In particular, by means of the bridge circuit, a cost-effective development of the above-mentioned device is created within the scope of the invention. RC elements for voltage limiting are rendered superfluous as a result of the invention. In addition, there is no longer a need for SCR power converters in addition to a transistor switch. As part of the invention, each saturation switching branch comprises at least one two-pole submodule with a bridge circuit. Each switching branch can be connected at its end facing away from the respective high-voltage winding to a potential point common to both high-voltage windings.

According to an advantageous development, each saturation switching branch can be connected to a ground connection on its side facing away from the assigned high-voltage winding. In other words, the low-voltage-side potential point to which both high-voltage windings can be connected is a ground connection.

Advantageously, each submodule forms a full bridge circuit comprising a first series circuit branch and a second series circuit branch, each of which is connected in parallel with the DC voltage source, wherein each series circuit branch comprises a series circuit consisting of two power semiconductor switches, the potential point between the power semiconductor switches of the first series circuit branch being connected to a first terminal of the submodule and the potential point between the power semiconductor switches of the second series circuit branch being connected to the second terminal of the submodule. As already mentioned above, with such a full-bridge circuit it is possible to generate either the source voltage dropped across the DC source, a zero voltage, or the inverse source voltage at the two terminals. With a full bridge, therefore, a single saturation switching branch is essentially sufficient to drive DC saturation currents with the desired polarization through each high-voltage winding.

As part of this development, however, it is also possible that each high-voltage winding is assigned its own separate saturation switching branch, wherein both saturation switching branches have submodules with a full-bridge circuit.

Within the scope of the invention, all submodules are preferably designed identically.

Advantageously, each power semiconductor switch is a so-called IGBT with a reverse-biased freewheeling diode, a so-called GTO, a transistor switch or the like, connected in parallel. In the context of the present invention, power semiconductor switches are controllable power semiconductors. Controllable power semiconductors are, for example, thyristors, IGBTs, GTOs, transistor switches or the like. Although the freewheeling diodes cannot be controlled as such, they should also be covered by the term "power semiconductor switch" if they are reverse-biased and connected in parallel with a controllable power semiconductor, for example an IGBT. In this case, of course, their only function is to protect the controllable power semiconductor, which is also covered by the term, from an overvoltage. Within the scope of the invention, both on- and off-switchable power semiconductor switches are preferred. Power semiconductor switches, such as thyristors, do not fall into this category as they can only be triggered, but not transferred back into their blocking mode, by a control signal. However, such power semiconductor switches are well known to the person skilled in the art, so that at this point a more detailed implementation can be dispensed with.

Ideally, each saturation switching branch has a series circuit consisting of at least two submodules. The two-pole sub-modules enable a simple scalability of the saturation switching branch. Each power semiconductor switch is limited to a specific maximum switchable voltage. For example, this is between 2 and 5 kV. If higher voltages are required for the saturation of the core sections, this requirement can be easily met by the series connection of the submodules.

Ideally, each DC voltage source comprises an energy storage unit. Electrical energy storage devices that are preferably unipolar are suitable devices for the energy storage units. For example, capacitors, supercapacitors, superconducting coils, battery accumulators, supercaps or the like are possible candidates for energy storage units. The energy storage units listed or other electrical energy storage devices can be present in a submodule individually or else connected in series, in which case the term "energy storage unit" is used to refer to this series circuit as a whole.

The energy storage unit is conveniently connected to a charging unit for charging the energy storage unit. The design of the charging unit is arbitrary within the context of the invention. However, it is essential that it provides the electrical power for the energy storage unit required during operation.

According to a further development in this respect, the charging unit has a rectifier connected to an AC voltage source. In this case, the energy storage unit is conveniently designed as a capacitor. For example, the AC voltage source is an AC voltage source independent of the high-voltage grid. For example, the AC voltage source is a standard high-current outlet in the low-voltage range. In contrast, the voltage level of the AC voltage source is in the medium-voltage range, i.e. in a range between 1 kV and 52 kV. Within the scope of the invention, it is also possible to extract the power required for charging from the AC or high-voltage grid for which the device according to the invention is intended to provide reactive power compensation.

Advantageously, a saturation switching branch is provided for each high-voltage winding. As already mentioned above, such a saturation switching branch within the context of the invention has at least one two-pole submodule, which is conveniently equipped with a full- or half-bridge circuit.

According to a development of the invention, so-called compensating windings are provided which are used for filtering the AC voltage, so that no major network distortions occur in the connected high-voltage network. These compensating windings can be inductively coupled to the energy storage unit, according to an advantageous development. Of course, an inductive coupling for the power supply of the energy storage unit is also possible without compensating windings.

Advantageously, each core section, each high-voltage winding and each saturation switching branch is arranged in a vessel filled with an insulating fluid. The vessel is ideally located at a ground potential. In deviation from this, the core sections and the windings are arranged in a first vessel and each switching branch is arranged in a second separate vessel, each vessel being filled with an insulating fluid. Different insulating fluids, i.e. an insulating fluid and/or an insulating gas, can be used in the vessels. Advantageously, the first and second vessels, which are both located at a ground potential, are electrically connected to each other by means of high-voltage feed-throughs.

The invention also relates to a method for reactive power compensation in a high-voltage network comprising at least one phase conductor which carries a mains AC voltage, each phase conductor being connected via a high-voltage connection to a first high-voltage winding and to a second high-voltage winding connected in parallel thereto, which each surround a first and a second core section respectively, wherein each high-voltage winding can be connected via at least one saturation switching branch to a ground connection which comprises at least one submodule having a bridge circuit consisting of a DC voltage source and power semiconductor switches, in which in the case of a positive AC mains voltage, the power semiconductor switches are actuated, for example, in such a way that a negative direct current flows through the second high-voltage winding, and in the case of a negative AC mains voltage the power semiconductors are actuated in such a way that a positive direct current flows through the first high-voltage winding, the DC currents being adjusted in such a way that a desired saturation of the core sections surrounded by the high-voltage windings is generated.

According to the invention, a bridge circuit which is part of a two-pole submodule can be used to saturate the core section, the winding of which is not energized by any alternating current, or one that does not exceed a specified threshold value, in the respective prevailing half-period of the alternating voltage. The actuation of the bridge circuit enables the desired core saturation in a particularly simple way. The coordinated actuation of transistor switches and thyristor valves, which can essentially lead to the same result, is comparatively complicated, so that a simple and cost-effective method is also provided according to the invention.

Additional practical embodiments and advantages of the invention are the subject matter of the following description of exemplary embodiments of the invention by reference to the figures of the drawing, wherein identical reference signs refer to components with equivalent function.

DETAILED DESCRIPTION OF THE INVENTION

Figure 1:
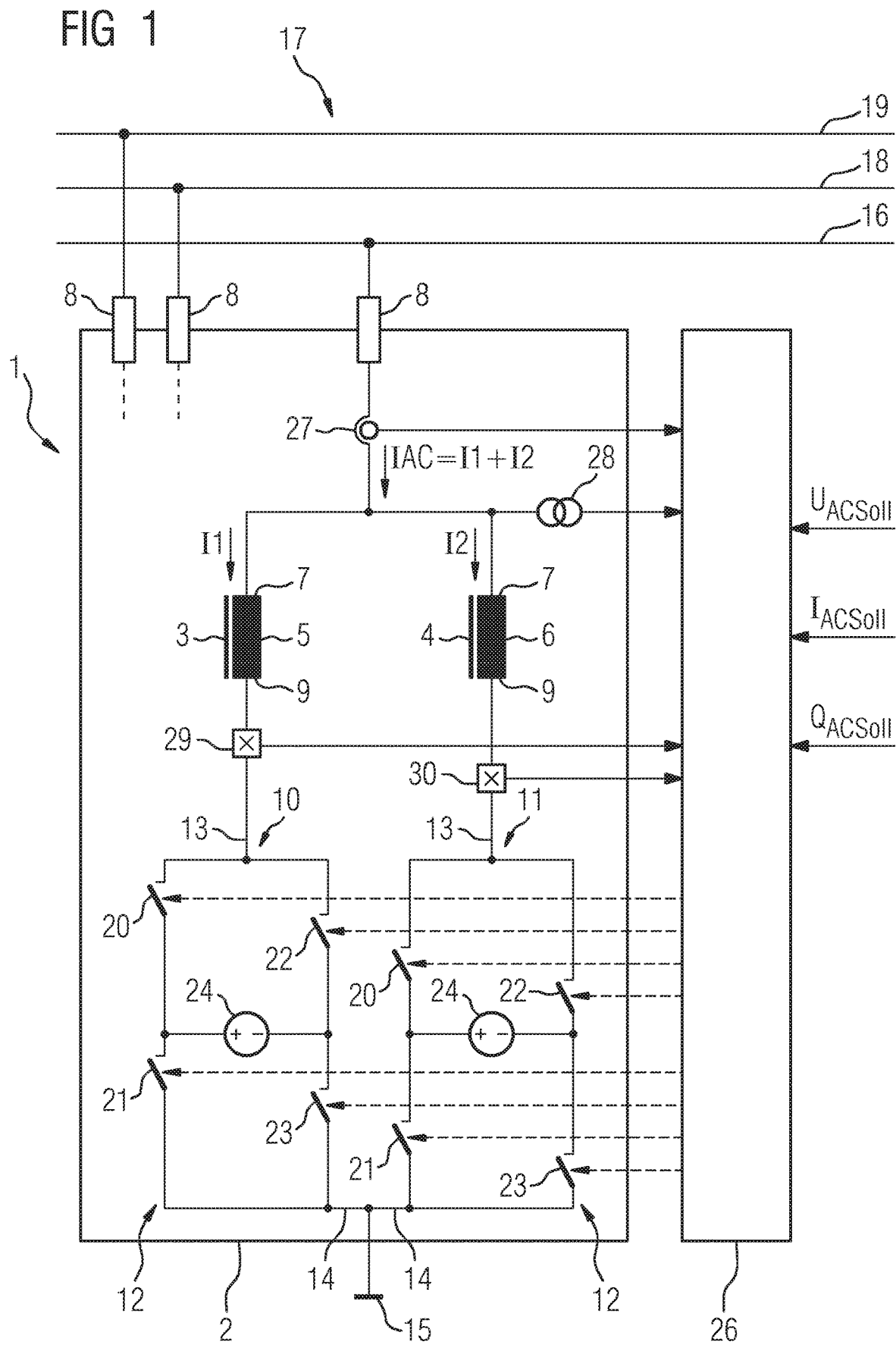
FIG. 1 shows an exemplary embodiment of the device according to the invention in a schematic representation.

FIG. 1 shows an exemplary embodiment of the device 1 according to the invention, which has a vessel 2 filled with an insulating fluid. Mineral oils, but also ester fluids or the like, can be considered as insulating fluids. On the one hand, the insulating fluid provides the necessary voltage resistance for components of the device 1 which are at a high voltage potential compared to the vessel 2 at ground potential. In addition, the insulating fluid is used to cool the components that generate heat during operation.

Within the vessel 2 a core is arranged, which is composed of a magnetizable material, here iron sheets resting flat against one another, and forms a first core arm 3 and a second core arm 4 as the core sections. The first core arm 3 is surrounded by a first high-voltage winding 5. The second core arm 4 is surrounded by a second high-voltage winding 6. A closed magnetic or iron circuit is formed by yokes, not shown in the drawing, which extend from the upper end of the first core arm 3 to the upper end of the second core arm 4 and from the lower end of the core arm 3 to the lower end of the core arm 4. In addition, two return arms, also not illustrated, are provided, which are not enclosed by any winding and extend parallel to the core arms 3 and 4 respectively to the right and left. In other words, a so-called 2/2 core is provided.

The first high-voltage winding 5 and the second high-voltage winding 6 each have a high-voltage end 7, with which they are connected to a high-voltage connection 8. If the device 1 is arranged in a vessel filled with insulating fluid, the high-voltage connection 8 is designed as a feed-through, for example. The feed-through penetrates the vessel wall and is equipped with an open-air connection at its free end, located outside the vessel. The open-air connection, which is not shown in the figure, is used to connect an air-insulated conductor. At its low-voltage end 9, the first high-voltage winding 5 and the second high-voltage winding 6 are each connected to a saturation switching branch 10 or 11, each saturation switching branch 10, 11 of which having a two-pole submodule 12 which is connected to the respective high-voltage winding 5 or 6 with a first terminal 13 and to a common potential point 15 with a second terminal 14. The potential point 15 in the exemplary embodiment shown is grounded. In other words, the high-voltage windings 5 and 6 are connected, or at least can be connected, in parallel.

The high-voltage connection 8 is used to connect the high-voltage windings 5 and 6 to a phase conductor 16 of a high-voltage grid 17, wherein the high-voltage grid 17 has two additional phase conductors 18 and 19, each connected in turn via a high-voltage connection 8 to two high-voltage windings and two saturation switching branches. In other words, the device 1 has an identical design for each phase 16, 18, 19 of the high-voltage grid 17, wherein for reasons of clarity only the structure for one phase conductor 16 is shown here.

It is essential within the context of the invention that each saturation switching branch 10 or 11 has a two-pole submodule 12, which is equipped with a bridge circuit consisting of power semiconductor switches 20, 21, 22 and 23 and a DC voltage source 24, which is preferably unipolar and thus has a fixed positive and a fixed negative terminal.

The bridge circuit can be a half-bridge or a full-bridge within the scope of the invention. In FIG. 1, each submodule is equipped with a full bridge with four power semiconductor switches 20, 21, 22, 23. A half-bridge comprises only two power semiconductor switches. For the convenient actuation of the four power semiconductor switches 20, 21, 22 and 23, a control unit 26 is provided, which can be supplied on the input side with setpoint values for the voltage UACsoll, the alternating current IACsoll and the reactive power QACsoll. A current sensor 27 is used to detect the AC current IAC flowing from the phase conductor 16 to the high-voltage windings 5 and 6, wherein a voltage sensor 28 detects the voltage dropped across the high-voltage side of the high-voltage windings 5 and 6. The current sensor 27 and the voltage sensor 28 are connected to the control unit 26 via signal cables not shown in the drawing. Sensors 29 and 30 can also be seen on the low-voltage side 9 of the high-voltage windings 5 or 6, which sensors are also connected to the control unit 26 via signal cables and detect currents that flow between the respective submodule 12 and the respective high-voltage winding 5 or 6.

The power semiconductor switches 20, 21, 22 and 23 of a sub-module 12 can be transferred by the control unit 26 by means of appropriate control signals, represented by dashed lines, from a disconnected position in which a current flow through the power semiconductor switches is interrupted, to a conducting position in which a current flow through the power semiconductor switches is enabled, or vice versa from the conducting position to the disconnected position.

The principle of operation of the device 1 is as follows: if the voltage detected by the voltage sensor 28 is positive, the power semiconductor switches 22 and 23 of the saturation circuit 10 are closed. It is assumed at this point that the core arm 3 has been previously saturated by a direct current flowing from the submodule 12 of the first saturation switching branch to the high-voltage winding 5, so that for the positive half-wave of the alternating voltage, the AC resistance of the high-voltage winding 5 is lower than the AC resistance of the high-voltage winding 6. Thus, almost all the AC current IAC flows down to ground via the current path labeled I1. In the positive half-wave of the alternating voltage the power semiconductor switches 21 and 22 are therefore closed, so that the DC voltage source 24 of the saturation circuit 11 drives a direct current which flows from the high-voltage winding 6 to ground 15. During the positive half-wave of the alternating voltage in phase conductor 16, the second core arm 4 can thus be saturated in the desired manner.

During the negative half-wave, on the other hand, in which the voltage measured by the sensor 28 is negative, the alternating current IAC essentially flows through the second high-voltage winding 6, so that by closing the power semiconductor switches 20 and 23 and opening the power semiconductor switches 21 and 22 of the submodule 12 of the first saturation switching branch 10 a saturation DC current is generated, which flows from the submodule 12 to the first high-voltage winding 5 or vice versa, and provides the desired saturation of the core arm 3.

Figure 2:
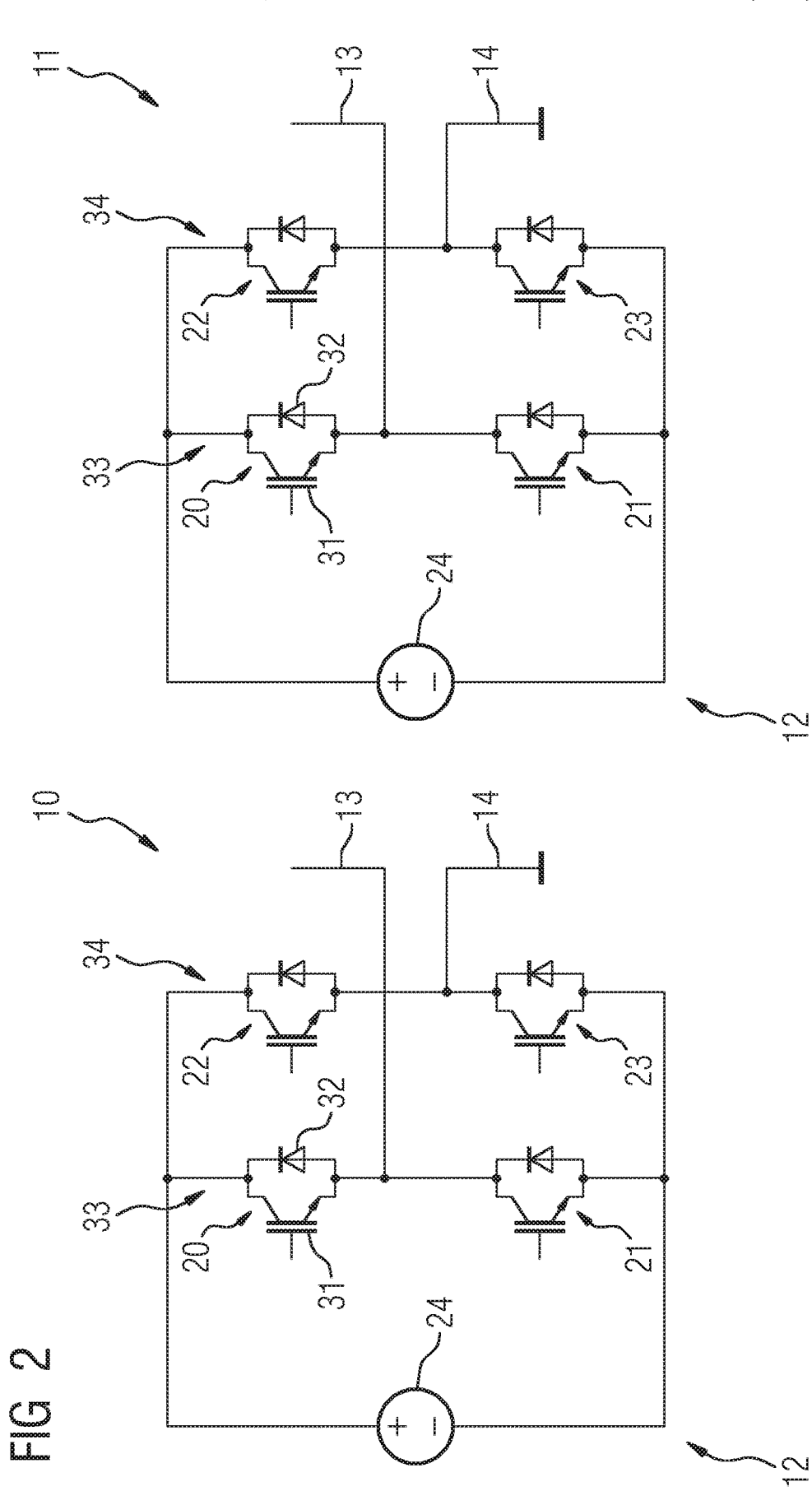
FIG. 2 shows the saturation switching branch of the device according to FIG. 1.

FIG. 2 shows the structure of the submodules 12 of the first and second saturation circuits 10, 11 more precisely. It can be seen that the submodules for both saturation switching branches 10 and 11 are designed identically. It can also be seen that the power semiconductor switches 20, 21, 22, 23 comprise a so-called IGBT 31, to which a reverse-biased free-wheeling diode 32 is connected in parallel. The structure of an IGBT with a free-wheeling diode is generally known, so that at this point it is not necessary to discuss their principle of operation in more detail. The essential point is that the free-wheeling diode 22 is used to protect the IGBT against overvoltages in the reverse direction. The IGBT 31 and diode 32 are usually housed in a common switch housing. IGBT 31 and free-wheeling diode 32 are referred to here collectively as power semiconductors.

Each module 12 is designed as a so-called full bridge and comprises a first series circuit branch 33 and a second series circuit branch 34, each consisting of two power semiconductor switches 20, 21 and 22 and 23 connected in series. The potential point between the power semiconductor switches 20, 21 of the first series circuit branch 33 is connected to the first terminal 13 and the potential point between the power semiconductor switches 22 and 23 of the second series circuit branch 34 is connected to the terminal 14 of the submodule 12.

Figure 3:
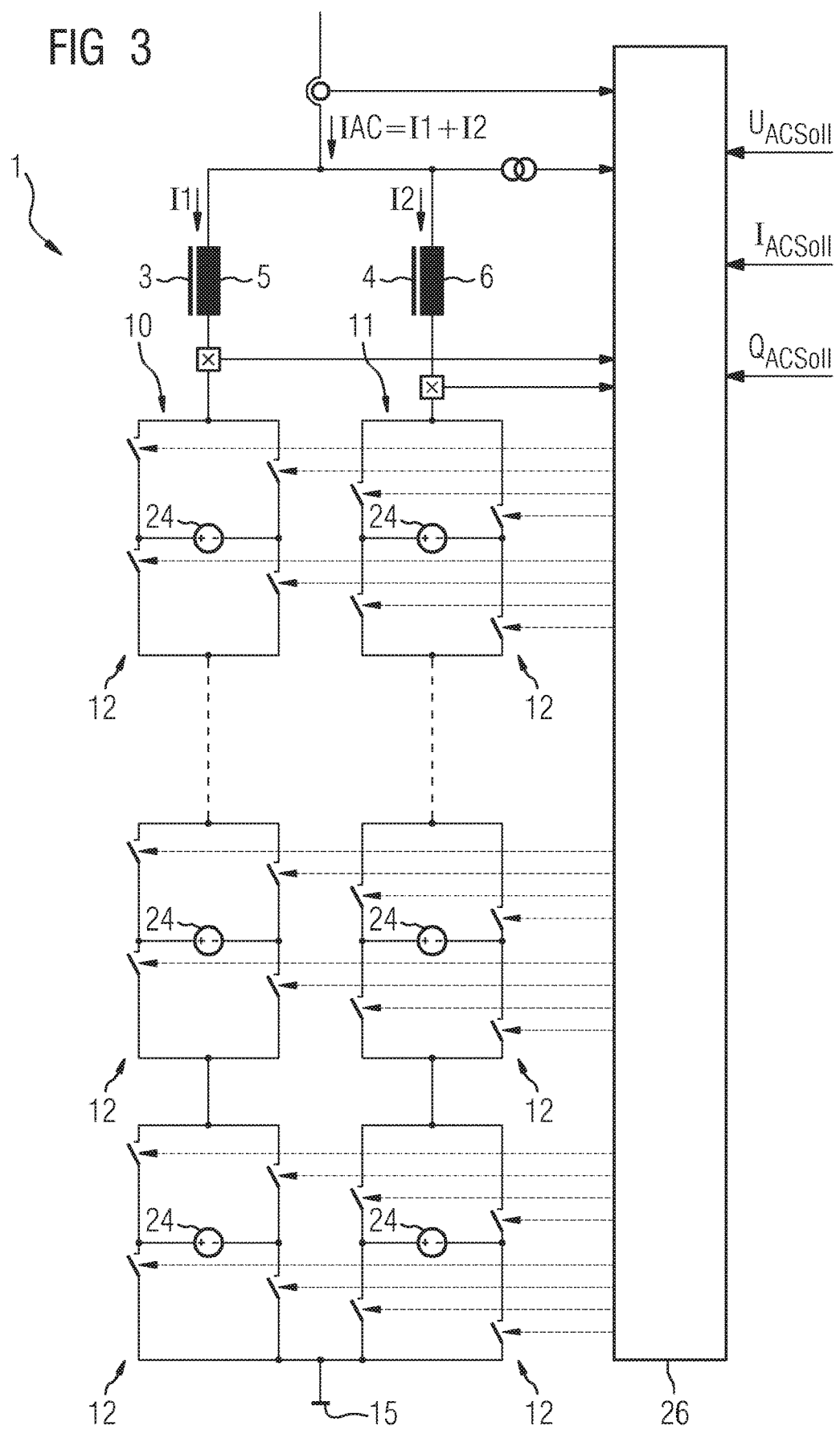
FIG. 3 shows another exemplary embodiment of the device according to the invention.

FIG. 3 shows another exemplary embodiment of the device 1 according to the invention, wherein for reasons of clarity only the components for connection to a phase of the high-voltage network 17 are shown. Furthermore, the high-voltage connections 8 and the vessel 2 are no longer illustrated.

It can be seen that each saturation switching branch 10 or 11 consists of a series circuit of a plurality of submodules 12, which are all controlled by the control unit 26 either identically or differently, so that the DC voltage for generating the DC current used to saturate the core arms 3, 4 is scalable according to the respective requirements.

Figure 4:
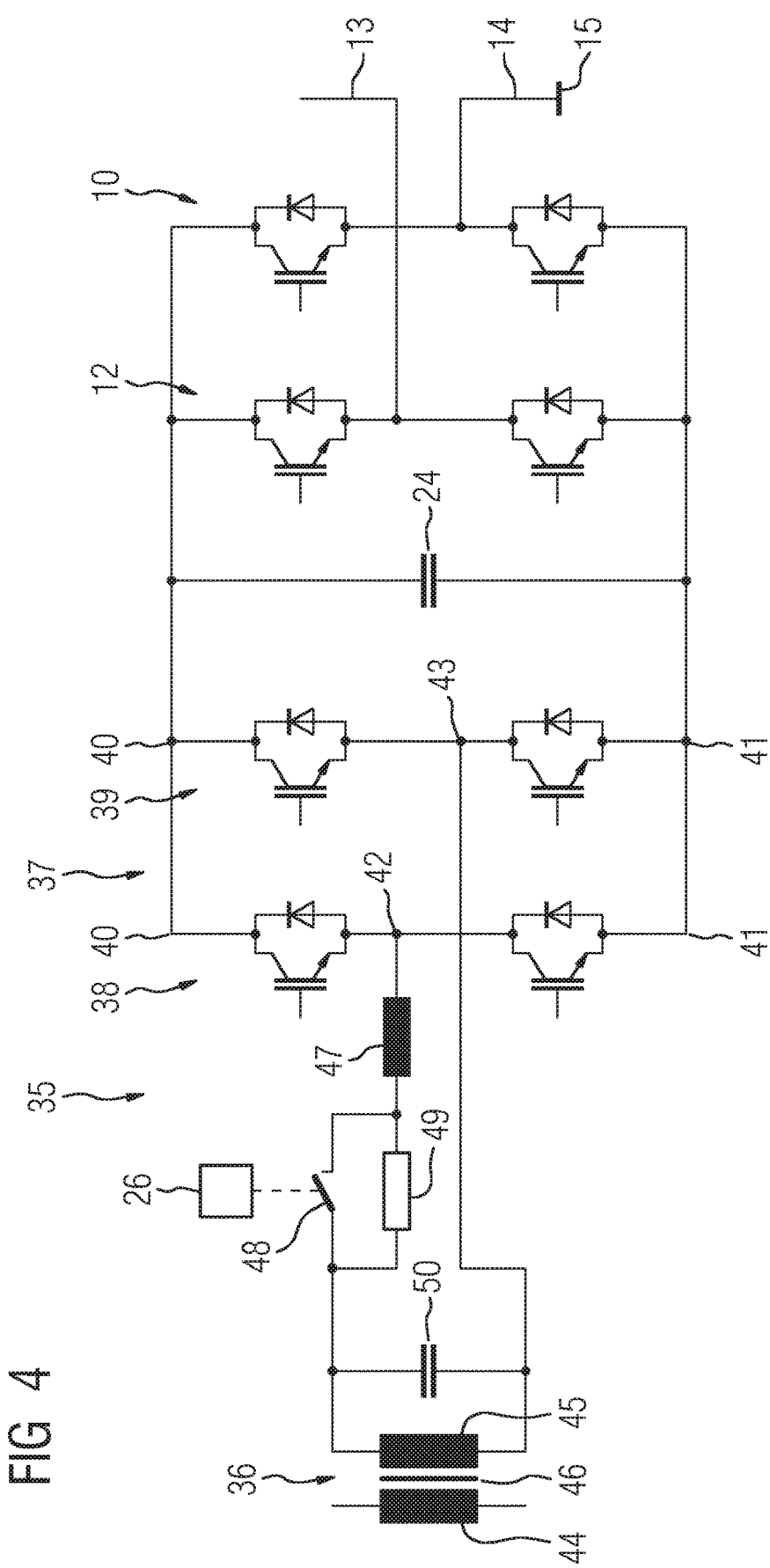
FIG. 4 shows a possible charging unit for the device according to the invention.

FIG. 4 shows a submodule 12 according to FIG. 2, wherein the energy storage unit 24 is designed as a unipolar capacitor. Furthermore, a charging unit 35 is illustrated, which is composed of an AC current source 36 and a rectifier 37. The rectifier 37 consists of two phase module branches 38 and 39, each having a DC voltage connection 40 or 41 and an AC voltage connection 42 and 43. A switching branch which is equipped with at least one power semiconductor is arranged between the AC voltage connection 42, 43 and each DC voltage connection 40 or 41. The DC voltage connection 40 is connected to a first pole of the capacitor 24, wherein the DC voltage connection 41 is connected to the second pole of the capacitor 24. Such a rectifier is known, however, so that a more precise presentation of its topology and mode of operation can be omitted at this point.

The AC voltage source 36 is implemented as a transformer, which has a primary winding 44 and a secondary winding 45, which are inductively coupled to each other via a core 46.

A smoothing reactor 47 is used to smooth the resulting AC voltage. The charging unit 35 is also equipped with a switch 48, connected in parallel to a switching resistor 49. By means of the switch 48, the resistor 49 can be connected into the circuit or bypassed so that the required charging of capacitor 24 of submodule 12 can occur. A snubber capacitor 50 is used to prevent overvoltages on the secondary winding 45.

Figure 5:
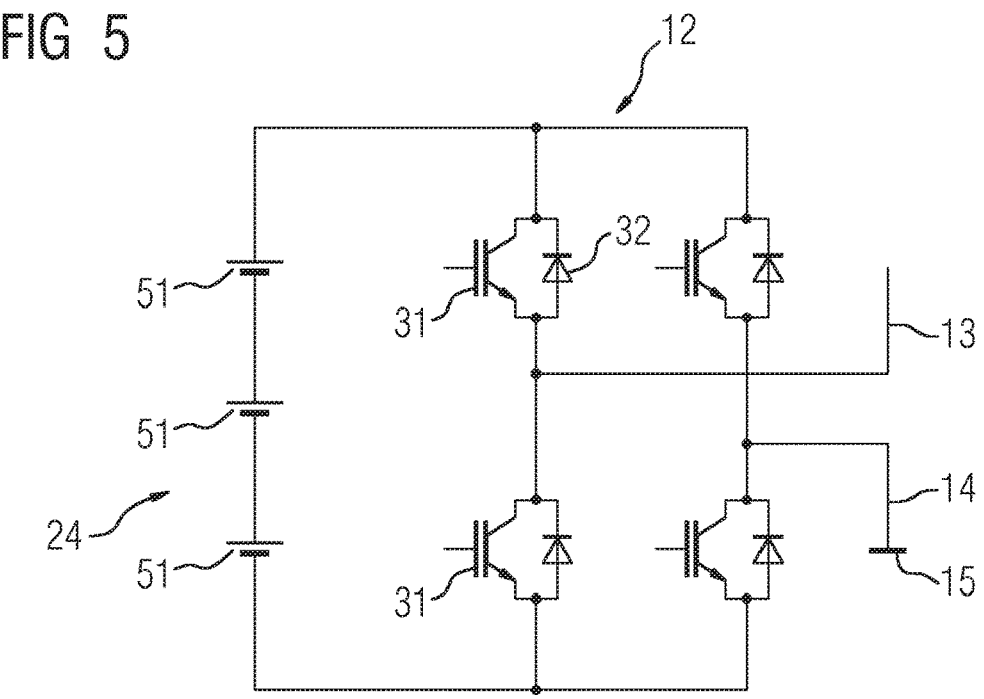
FIG. 5 shows a submodule for a saturation switching branch in a schematic representation.

FIG. 5 shows another exemplary embodiment of a submodule 12, which has a series circuit of a plurality of batteries 51 instead of a single capacitor as a DC voltage source 24. Rechargeable batteries can be used instead of batteries 51 in a variant embodiment of the invention.

Figure 6:
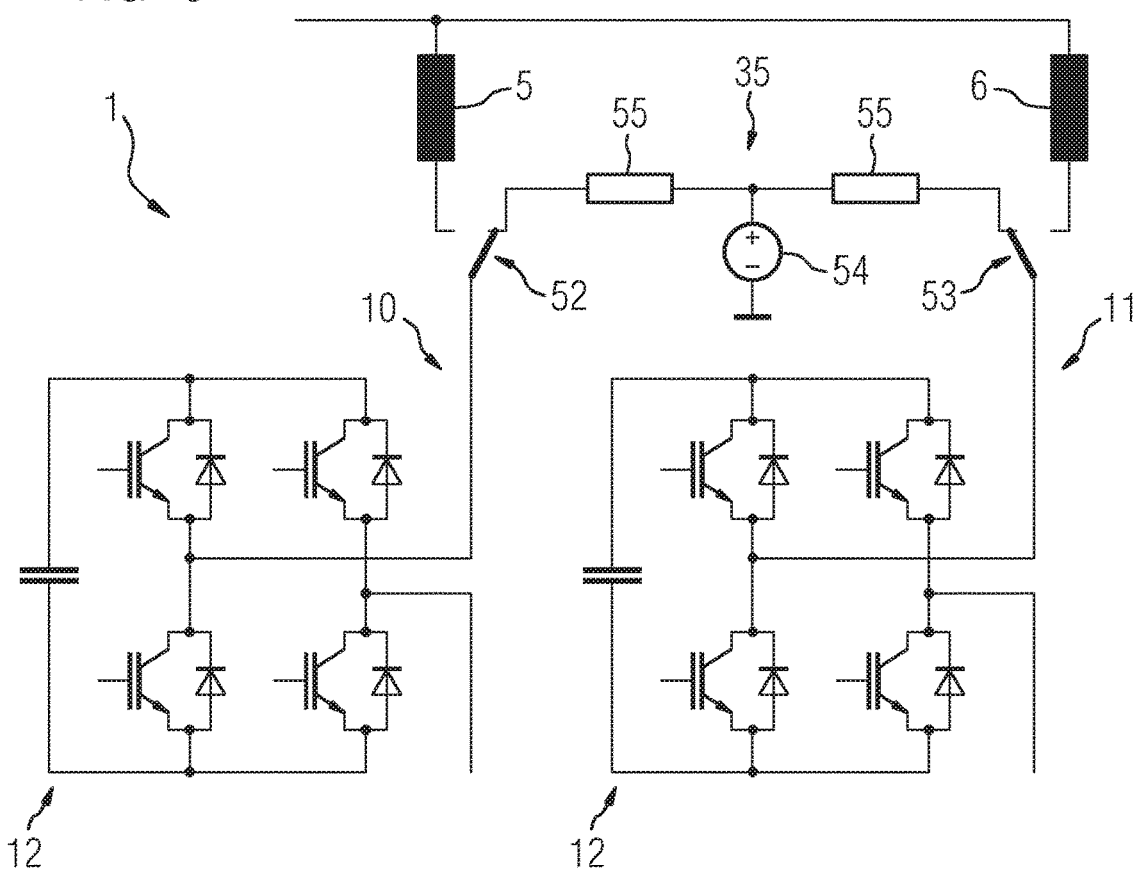
FIG. 6 shows another exemplary embodiment of the device according to the invention with a charging unit for two saturation switching units.

FIG. 6 shows another exemplary embodiment of the device according to the invention, which has a charging unit 35 that differs from the device according to FIG. 4. The charging unit shown is only intended for the initial charging of the switching branches until the operating state is established. The charging branch 35 can then be removed and each switching branch can be supplied from the load current by intelligent control. The DC voltage source 24 of the submodules 12 is again designed as a capacitor. In this case, however, each saturation switching branch 10 or 11 can be connected to the charging unit 35 via a charging switch 52 or 53, so that only one charging unit is provided for both saturation switching branches 10, 11. In the case shown schematically in FIG. 6, the charging unit 35 is again equipped with a DC voltage source 54, which is connected to the respective charging switches 52 and 53 via suitable snubber resistors 55. For example, the DC voltage source 54 comprises a rectifier connected to an AC source. In contrast to this, the DC voltage source 54 is implemented as a battery, supercap, accumulator or similar.

Figure 7:
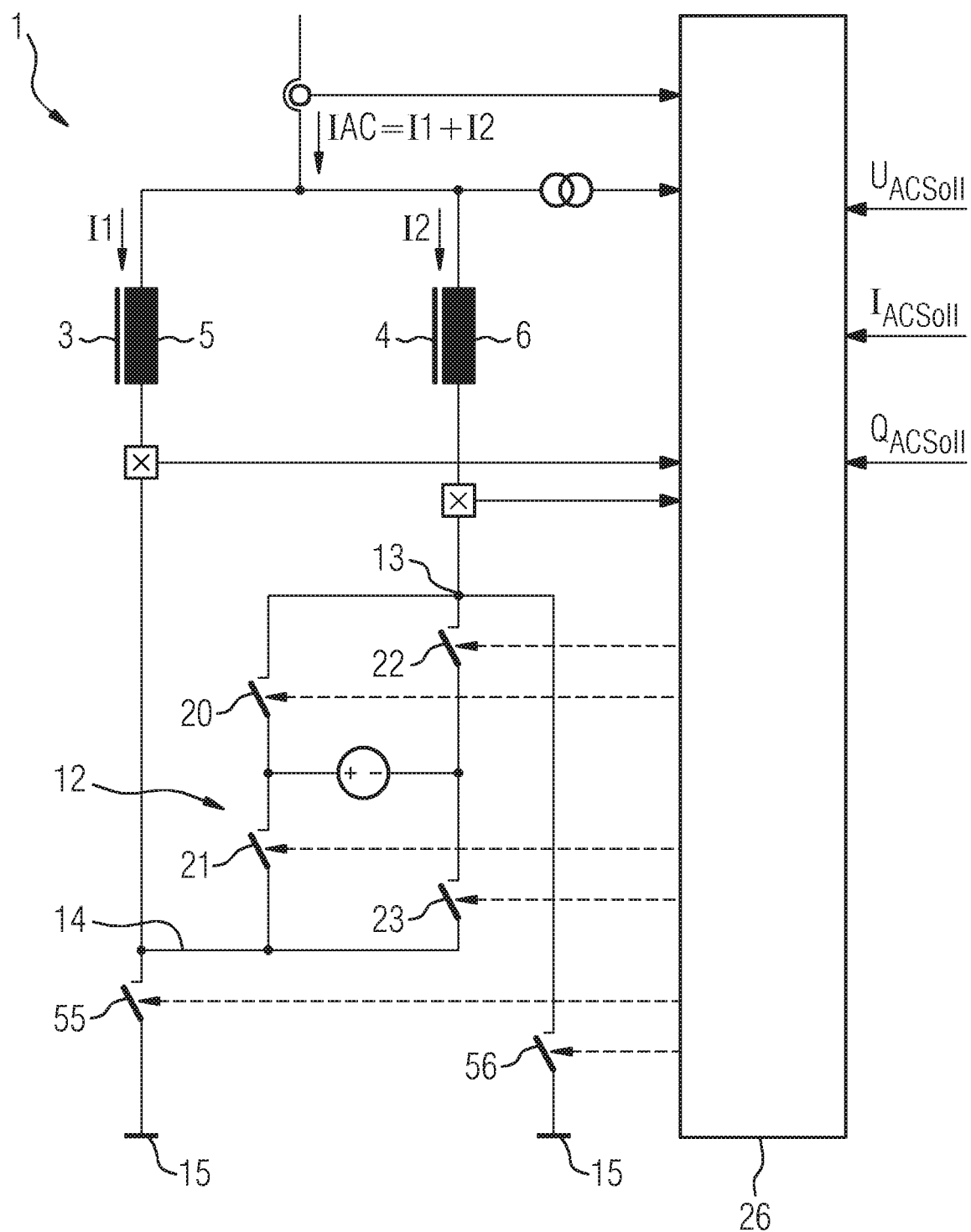
FIG. 7 shows another exemplary embodiment of the control device.

FIG. 7 shows a further exemplary embodiment of the device 1 according to the invention, which differs from the device 1 shown in the previous figures in that only one saturation circuit 10 is provided, which is connected to both the low-voltage end 9 of the first high-voltage winding 5 and the low-voltage end 9 of the second high-voltage winding 6. For this purpose, the first terminal 13 of the submodule 12 is connected to the second high-voltage winding 6, while the second terminal 14 of the submodule 12 is connected to the low-voltage side 9 of the first high-voltage winding 5. Both the first terminal 13 and the second terminal 14 can be connected to the ground potential 15 by means of the grounding switches 55 or 56, wherein the switches 55 and 56 are designed as power semiconductor switches and can be controlled by the control unit 26. The signal cables required for this purpose are connected to the charging switches 55, 56 and the control unit 26, and are shown in FIG. 7 by dotted lines. In order to switch the submodule 12 between the first high-voltage winding 5 and ground 15 with the desired polarization, the grounding switch 55 is opened and the grounding switch 56 is closed. By closing the power semiconductor switches 21 and 22, the DC voltage source 24 is connected in series with the first high-voltage winding 5 and drives a saturation DC current from the submodule 12 towards the high-voltage winding 5. By opening the grounding switch 56 and closing the grounding switch 55 and closing the power semiconductor switches 22 and 21, with the power semiconductor switches 20 and 23 open, the DC voltage source 24 can be connected in series with the second high voltage winding 6 with the desired polarization.

The invention claimed is:

1. A device for reactive power compensation in a high-voltage network having at least one phase conductor, the device comprising:
   at least one high-voltage connection configured for connection to the at least one phase conductor;
   a first core section and a second core section being part of a closed magnetic circuit;
   a first high-voltage winding surrounding said first core section and having a high-voltage end and a low-voltage side;
   a second high-voltage winding surrounding said second core section and connected in parallel with said first high-voltage winding, said second high-voltage winding having a high-voltage end and a low-voltage side;
   at least one saturation switching branch configured to saturate said first and second core sections and having controllable power semiconductor switches;
   a controller for controlling said controllable power semiconductor switches;
   said first and said second high-voltage winding are connected at said high-voltage end to said at least one high-voltage connection and connected at said low-voltage side to said at least one saturation switching branch;
   said at least one saturation switching branch having at least one two-pole submodule with a bridge circuit having said controllable power semiconductor switches and a DC voltage source, so that depending on an actuation of said controllable power semiconductor switches, said DC voltage source can either be connected in series to at least one of said first or second high-voltage windings or bypassed, said at least one two-pole submodule having a first terminal and a second terminal; and
   said at least one two-pole submodule forming a full bridge circuit having a first series circuit branch and a second series circuit branch, each said first and said second series circuit branch is connected in parallel with said DC voltage source, each of said first and second series circuit branches having a series circuit containing two of said controllable power semiconductor switches, wherein a potential point between said controllable power semiconductor switches of said first series circuit branch is connected to said first terminal of said at least one two-pole submodule and a potential point between said controllable power semiconductor switches of said second series circuit branch is connected to said second terminal of said at least one two-pole submodule.

2. The device according to claim 1, wherein said at least one saturation switching branch on a side facing away from an assigned said first or second high-voltage winding can be connected to a ground connection.

3. The device according to claim 1, wherein each of said controllable power semiconductor switches is an insulated-gate bipolar transistor with a reverse-biased freewheeling diode, a gate turn-off thyristor or a transistor switch, connected in parallel.

4. The device according to claim 1, wherein said at least one saturation switching branch is a series circuit containing at least two said two-pole submodules.

5. The device according to claim 1, wherein said voltage source contains an energy storage unit.

6. A device for reactive power compensation in a high-voltage network having at least one phase conductor, the device comprising:
   at least one high-voltage connection configured for connection to the at least one phase conductor;
   a first core section and a second core section being part of a closed magnetic circuit;
   a first high-voltage winding surrounding said first core section and having a high-voltage end and a low-voltage side;
   a second high-voltage winding surrounding said second core section and connected in parallel with said first high-voltage winding, said second high-voltage winding having a high-voltage end and a low-voltage side;
   at least one saturation switching branch configured to saturate said first and second core sections and having controllable power semiconductor switches;
   a controller for controlling said controllable power semiconductor switches;
   said first and said second high-voltage winding are connected at said high-voltage end to said at least one high-voltage connection and connected at said low-voltage side to said at least one saturation switching branch;
   said at least one saturation switching branch having at least one two-pole submodule with a bridge circuit having said controllable power semiconductor switches and a DC voltage source, so that depending on an actuation of said controllable power semiconductor switches, said DC voltage source can either be connected in series to at least one of said first or second high-voltage windings or bypassed, said voltage source containing an energy storage unit; and
   a charging unit connected to said energy storage unit and said charging unit configured to charge said energy storage unit.

7. The device according to claim 6, wherein said charging unit contains a rectifier for connecting to an AC voltage source.

8. The device according to claim 1, wherein said at least one saturation switching branch is one of two saturation switching branches, one of said saturation switching branches is provided for each of said first and second high-voltage windings.

9. The device according to claim 6, wherein said charging unit is inductively coupled to said energy storage unit.

10. A device for reactive power compensation in a high-voltage network having at least one phase conductor, the device comprising:
    at least one high-voltage connection configured for connection to the at least one phase conductor;
    a first core section and a second core section being part of a closed magnetic circuit;

a first high-voltage winding surrounding said first core section and having a high-voltage end and a low-voltage side;
a second high-voltage winding surrounding said second core section and connected in parallel with said first high-voltage winding, said second high-voltage winding having a high-voltage end and a low-voltage side;
at least one saturation switching branch configured to saturate said first and second core sections and having controllable power semiconductor switches;
a controller for controlling said controllable power semiconductor switches;
said first and said second high-voltage winding are connected at said high-voltage end to said at least one high-voltage connection and connected at said low-voltage side to said at least one saturation switching branch;
said at least one saturation switching branch having at least one two-pole submodule with a bridge circuit having said controllable power semiconductor switches and a DC voltage source, so that depending on an actuation of said controllable power semiconductor switches, said DC voltage source can either be connected in series to at least one of said first or second high-voltage windings or bypassed, said voltage source containing an energy storage unit; and
a vessel filled with an insulating fluid, wherein each of said first and second core sections, each of said first and second high-voltage windings and said at least one saturation switching branch is disposed in said vessel.

* * * * *